Patented May 14, 1940

2,200,747

UNITED STATES PATENT OFFICE 2,200,747

ANTIOXIDANT

Louis H. Howland, Nutley, N. J., assignor, by mesne assignments, to United States Rubber Company, New York, N. Y., a corporation of New Jersey No Drawing. Application July 3, 1935,
Serial No. 29,649

3 Claims. (Cl. 260—809)

This invention relates to chemicals for the preservation of rubber and similar easily oxidizable organic compounds, and more particularly to a method of producing rubber products having increased resistance to the deteriorating influences of heat, light and air, and relates also to the resulting products.

An object of the invention is to provide a composition of matter capable of retarding the deterioration of rubber and the like, particularly of rubber stocks containing high loadings of carbon black such as the tire tread portions of vehicle tires of the solid or pneumatic variety. A further object is to prepare such tire tread antioxidants and antiflex cracking agents by an economical and practical process and from easily available chemicals. Further objects will be apparent from the following description.

The age resistors or antioxidants herein are generally described as the products formed by the reaction, under conditions favoring nuclear alkylation, of an arylamine and an aliphatic alcohol or the corresponding aliphatic halide, wherein the aliphatic alcohol or halide comprises an aliphatic hydrocarbon group containing at least two and preferably more than two carbon atoms, and wherein the aryl-amine comprises an amino group having at least one replaceable hydrogen atom as illustrated by the secondary amines known as diaryl amines which include diphenyl amine, its homologues and analogues, and primary amines which include aniline, its homologues and analogues.

The reaction may be carried out under various conditions, as to temperature and pressure, including atmospheric or higher pressures. Nuclear alkylation is best favored by the presence of a catalyst or condensing agent of the acidic type, for example, mineral non-oxidizing acids, halogen, or metal halides, for example, hydrochloric acid, iodine, ferrous iodide, hydrobromic acid, hydriodic acid, stannic chloride, ferrous bromide, aluminum chloride, zinc chloride, etc.; ammonium chloride may also be placed in this class.

The presence of such a condensing agent together with use of high temperatures promotes both the nuclear alkylation of primary and secondary arylamines, and the condensation of primary arylamines to form secondary arylamines. The reaction mixtures may be subjected to the high temperatures either during or subsequent to the initial highly exothermic stage of the reaction, such temperatures, in the presence of an acidic condensing agent, serving to induce migration of alkyl groups from nitrogen to the nucleus and particularly to the position para to the nitrogen. Some N-alkylation is also believed to occur under the reaction conditions, possibly as the result of failure of N-alkylated intermediate products to re-arrange completely to nuclear-alkylated amines. The reaction products are accordingly believed to be mixtures consisting predominantly of alkylated diaryl amines, wherein alkylation has occurred on at least one of the aryl nuclei and/or on the amino nitrogen atom.

The reaction product may be used as such or it may be freed of various components such as unreacted starting chemicals. Materials which lower the antioxidant value of the reaction product, such as acid or acidic substances, are preferably neutralized or removed.

During the reaction depending on whether the alcohol or halide is used, water or halogen acid is split off, ammonia is also split off when one of the starting materials is a primary arylamine. It is believed that the reaction products are made up to a major extent of a mixture of secondary and/or tertiary amines of the type

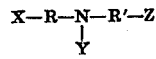

where R and R' are each an aryl nucleus which may contain further substituents such as amino, alkoxy or hydroxy groups; and X, Y and Z are hydrogen or an aliphatic hydrocarbon group containing at least two carbon atoms in the chain, at least one of said members X, Y and Z being such a hydrocarbon group. It is preferred to use as starting materials those aliphatic alcohols or halides in which the alkyl group comprises more than two carbon atoms, preferably in branched chain formation illustrated by isopropyl and tertiary butyl. The branched chain alcohols and halides are preferred since they more readily lead to nucleus alkylation, generally in the para position.

While the individual chemical components may be recovered and used, the multi-component reaction product possesses properties which are superior to individual components from the standpoint of protective action, cost, ease of incorporation in rubber, or of handling prior to adding to the rubber.

The following examples of preparation and use show various aspects of the invention, particularly from the standpoint of addition to rubber and are not to be construed as limiting thereof.

Example 1

85 grams (approximately 0.5 of a mole) of diphenylamine are refluxed with 62 grams (approximately 0.5 of a mole) of isopropyl bromide in the presence of 67 grams of powdered anhydrous aluminum chloride. The reaction is carried out with evolution of hydrogen chloride and after the reaction has substantially subsided, the temperature is raised to about 150° C. and kept at or around this point for about two hours. After the reaction is substantially completed, the aluminum chloride is removed in known manner by extraction with dilute hydrochloric acid. The oily material is separated from the water phase and is washed, dried, and vacuum distilled at approximately 5 mm. mercury pressure. The fraction distilling up to 170° C. contains unreacted diphenylamine. The fraction which distills from 170 to 250° C. constitutes the major proportion of the reaction product. 1.5 parts by weight of this latter fraction was incorporated in a typical tire tread composition containing by weight 100 parts of smoked sheet rubber, 42 parts carbon black, 10 parts of zinc oxide, 3.5 parts of pine tar, 1.25 parts of stearic acid, 3.5 parts of sulphur, 1.25 parts of hexamethylenetetramine, 0.35 part diphenylguanidine, and the mix tested before and after ageing. A control portion of similar composition but omitting the antioxidant was used as a blank.

The mixes were cured for 60 minutes at 45 pounds per sq. in. steam pressure with the following tensiles (T) and percent elongation at break (E) before and after ageing.

UNAGED

| Minutes of cure | Blank | | Mix containing anti-oxidant | |
|---|---|---|---|---|
| | T | E | T | E |
| 60 | 3320 | 690 | 4367 | 640 |

AGED—168 HOURS IN OXYGEN BOMB AT 300 LBS. PER SQ. IN. PRESSURE

| | | | | |
|---|---|---|---|---|
| 60 | 1574 | 540 | 2744 | 620 |

AGED—THREE WEEKS AT 158° F. IN GEER OVEN

| | | | | |
|---|---|---|---|---|
| 60 | 1415 | 460 | 2562 | 580 |

Example 2

50.7 grams (about 0.3 mole) of diphenylamine are reacted with 27 grams (approximately 0.45 mole) of isopropyl alcohol in the presence of 40.8 grams of anhydrous zinc chloride, under pressure and for about 12 hours at 245–250° C. The reaction mixture was then cooled and zinc chloride extracted with concentrated sodium hydroxide solution. The separated oil was washed, dried, filtered and vacuum distilled giving about 52 grams of a mobile liquid, distilling around 195° C. at 10 to 15 mm. mercury pressure. This material was tested in a tire tread composition as shown by Example 1, a control blank being used, and the other sample containing 1.5 parts by weight of the said distillate per 100 parts by weight of rubber. The mixes were cured in a mold at 45, 60, 75 and 90 lbs. per sq. in. steam pressure. Tensiles and elongation before and after ageing are as follows:

UNAGED

| Minutes of cure | Blank | | Mix containing antioxidant | |
|---|---|---|---|---|
| | T | E | T | E |
| 45 | 4394 | 690 | 4577 | 720 |
| 60 | 4498 | 660 | 4693 | 700 |
| 75 | 4445 | 640 | 4467 | 640 |
| 90 | 4145 | 630 | 4675 | 680 |

AGED—120 HOURS IN OXYGEN BOMB AT 70° C. AND 300 LBS. PER SQ. IN. PRESSURE

| | | | | |
|---|---|---|---|---|
| 45 | 1885 | 510 | 2463 | 540 |
| 60 | 693 | 250 | 2404 | 510 |
| 75 | 482 | 140 | 2323 | 470 |
| 90 | 484 | 140 | 2127 | 430 |

AGED—48 HOURS AT 212° F. IN AIR

| | | | | |
|---|---|---|---|---|
| 45 | 1738 | 370 | 2255 | 420 |
| 60 | 1186 | 260 | 1922 | 360 |
| 75 | 923 | 220 | 1487 | 270 |
| 90 | 827 | 180 | 1397 | 260 |

AGED—3 WEEKS AT 158° F. IN GEER OVEN

| | | | | |
|---|---|---|---|---|
| 45 | 2747 | 470 | 3332 | 530 |
| 60 | 1926 | 330 | 3476 | 490 |
| 75 | 1665 | 260 | 2771 | 400 |
| 90 | 1453 | 250 | 2977 | 410 |

Example 3

46.5 grams (0.5 mole) of aniline are heated under pressure for about 24 hours at 270° C. with 30 grams (approximately 0.5 mole) of isopropyl alcohol in the presence of 68 grams of zinc chloride. After cooling, the reaction mixture is extracted with concentrated boiling sodium hydroxide solution to remove the zinc chloride and the remaining oil was filtered, washed, dried, and distilled. The portion distilling between about 310° C. and 360° C. at atmospheric pressure was used as a rubber antioxidant in a typical tire tread composition as shown in Example 1. Portions of the control mix and of the mix containing about 1 part of the antioxidant to 100 parts by weight of rubber, were cured in a mold for 45, 60, 75 and 90 minutes at 45 lbs. steam pressure. Tensiles and elongation before and after ageing are as follows:

UNAGED

| Minutes of cure at 45 lbs./sq. in. steam pressure | Blank | | Mix containing antioxidant | |
|---|---|---|---|---|
| | T | E | T | E |
| 45 | 3996 | 660 | 4220 | 670 |
| 60 | 4154 | 660 | 4245 | 650 |
| 75 | 3878 | 620 | 4210 | 630 |
| 90 | 3982 | 620 | 4280 | 620 |

AGED—216 HOURS IN OXYGEN BOMB AT 70° C. AND 300 LBS. PER SQ. IN. PRESSURE

| | | | | |
|---|---|---|---|---|
| 45 | 1219 | 420 | 2477 | 540 |
| 60 | 838 | 300 | 2363 | 500 |
| 75 | 726 | 250 | 2292 | 450 |
| 90 | 843 | 280 | 2168 | 430 |

Other arylamines that may be reacted with the aliphatic alcohol or halide are the toluidines, naphthylamines, phenyl tolyl amines, phenyl xylyl amines, phenyl cumyl amines, ditolyl amines, dixylylamines, dicumylamines, phenyl naphthylamines, phenyl anisyl amine, phenyl phenetidyl amine, aminodiphenylamine, hydroxy diphenylamine, diamino diphenylamine, dihydroxy diphenylamine, diphenyl-p-phenylene diamine diphenyl-m-phenylene diamine.

Various proportions of materials may be reacted with each other depending upon the type of arylamine and aliphatic hydrocarbon to be combined and the invention is to be understood as not limited to the exact proportions shown by the examples.

Other aliphatic alcohols that may be reacted with diphenylamine or any of the other arylamines are ethyl alcohol, n-propyl alcohol, iso-propyl alcohol, n-butyl alcohol, n-amyl alcohol, hexyl alcohol, heptyl alcohol, iso-butyl alcohol, tertiary butyl alcohol, iso-amyl alcohol, secondary amyl alcohol, tertiary amyl alcohol, ethylene glycol, allyl alcohol, etc.

Other aliphatic halides that may be used to react with any of the above arylamines are the chloride, bromide or iodide of ethyl, n-propyl, iso-propyl, isopropenyl, methyl-2-allyl, n-butyl, allyl, isobutyl, tertiary butyl, iso-amyl, secondary amyl, tertiary amyl, heptyl, dodecyl, and ethylene, etc.

The composition of the multi-component reaction product is not definitely known. Where diphenylamine is reacted with either iso-propyl alcohol or halide, it is believed that the reaction mix is made up in greater or less proportion of the following individuals, φ standing for the phenyl group:

(a) Isopropyl diphenylamines (φ-NH-φ-i-propyl)

(b) N-isopropyl diphenylamine which is a tertiary amine

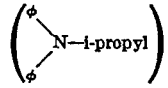

(c) Di-isopropyl diphenylamines (i-propyl-φ-NH-φ-i-propyl)

and/or

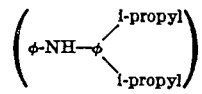

(d) Phenyl isopropyl-phenyl isopropylamine

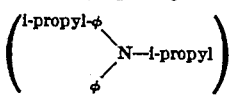

(e) Di-isopropyl-diphenyl isopropylamines

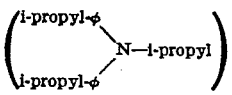

The conditions of reaction as illustrated by Examples 1 and 2 are such that the para-alkylated diarylamines are likely to predominate.

The antioxidants may be used in preserving other similarly oxidizable organic materials than rubber for example such as gasoline, transformer oils, fats, soaps, etc. These are all examples of organic substances which are known to deteriorate by absorption of oxygen from the air.

The term rubber is to be construed broadly as including caoutchouc, balata, gutta percha, reclaimed rubber, rubber isomers, latex whether naturally or artificially prepared, whether or not admixed with fillers, pigments, vulcanizing or accelerating agents.

The preservative may be incorporated by milling or similar process or otherwise into unvulcanized or vulcanized rubber, as by dipping the rubber or the like in a solution or emulsion of the preservative, or by adding the preservative to the latex or other dispersion of the rubber or the like, and the term "treating" in the claims is employed in a generic sense to include such steps.

The antioxidant reaction product may be used alone or in conjunction with other known antioxidants for example, the ketone-amine condensation productions, or the di-aryl p-phenylene diamine antioxidants.

The invention is particularly useful in the preservation of tires, tubes, hose, dipped goods, sheeting, films or threads as well as a number of other commercial articles.

Having thus described my invention, what I claim and desire to protect by Letters Patent is:

1. A process of preserving rubber which comprises adding to the same a composite product of reaction of a secondary aromatic amine chosen from the class consisting of the benzene and naphthalene series compound of the type R—X where R is an aliphatic hydrocarbon radical and X is a radical selected from the group consisting of OH and halogen, said product containg a major proportion of alkylated secondary aromatic amine material.

2. A process of preserving rubber which comprises adding to the same an amine material resulting from reacting a diarylamine chosen from the class consisting of the benzene and naphthalene series with a compound of the type R—X where R is an aliphatic hydrocarbon radical and X is a radical selected from the group consisting of OH and halogen, said material comprising a major proportion of a para-alkylated diarylamine material.

3. A process of preserving rubber which comprises adding to the same an amine material resulting from reacting a diphenylamine with a compound of the type R—X where R is an aliphatic hydrocarbon radical and X is a radical selected from the group consisting of OH and halogen, said material comprising a major proportion of a para-alkylated diphenylamine material.

LOUIS H. HOWLAND.

CERTIFICATE OF CORRECTION.

Patent No. 2,200,747.　　　　　　　　　　　　　　May 14, 1940.

LOUIS H. HOWLAND.

It is hereby certified that error appears in the printed specification of the above numbered patent requiring correction as follows: Page 3, first column, line 3, after "diamine" first occurrence, insert a comma; and second column, line 23, for the word "productions" read --products--; line 35, claim 1, after "series" insert --with a--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.